3,032,625
SULFONE-MODIFIED POLYETHYLENE
TEREPHTHALATE
Christian F. Horn, New York, N.Y., assignor to Union
Carbide Corporation, a corporation of New York
No Drawing. Filed Oct. 7, 1957, Ser. No. 688,424
17 Claims. (Cl. 260—75)

This invention relates to novel polyethylene terephthalate compositions and to a method for preparing such compositions. The compositions of the invention are unique, as compared with polyethylene terephthalates heretofore proposed, in possessing superior dyeability while retaining excellent thermal stability.

U.S. Patent 2,465,319 to Whinfield and Dickson describes several methods for preparing highly polymeric linear polymethylene terephthalates. One of these involves heating a lower alkyl terephthalate such as methyl, ethyl, propyl, butyl, amyl, hexyl and heptyl terephthalates with a polymethylene glycol under conditions producing ester interchange and the formation of a corresponding glycol terephthalate which, upon further heating to a temperature above its melting point, polymerizes into a highly polymeric linear polyester until a stage is reached at which filaments formed from the mass possess cold drawing properties. The polymerization or polycondensation may, if desired, be carried out in the presence of a catalyst. When ethylene glycol is the glycol used in its preparation, the highly polymeric linear ethylene terephthalate so produced has recurring structural units of the formula

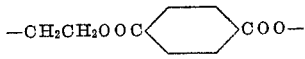

Polyethylene terephthalates have met with very considerable commercial success. They form tough fibers and sheets having melting points of the order of about 258 to 263° C. and are noted for their insolubility, high crystallinity, tensile strength, pliability, cold-drawing properties and resistance to water. Unfortunately, however, polymeric ethylene terephthalate is extremely difficult to dye. Thus, while polyethylene terephthalate fibers possess many of the most desirable characteristics required for textile applications, their impermeability to water and the consequent difficulty, in some instances impossibility, of dyeing fabrics therefrom by the ordinary dyeing procedures used for cotton, wool, natural silk, regenerated cellulose, nylon, and the like, has undoubtedly kept polyethylene terephthalates from achieving greater commercial acceptance.

It was to be expected that many efforts would be made to improve the dyeability of a film- and filament-forming material having as many desirable characteristics as those possessed by polyethylene terephthalate. Such efforts have indeed been made. Unfortunately, however, the efforts that have resulted in some degree of success in making polyethylene terephthalate more dyeable have done so only at the expense of degrading the polymer substantially with respect to its other characteristics. Thus, for example, a reported effort to improve the dyeability of polyethylene terephthalate by incorporating within its structure minor amounts of certain amino alcohols and thereby giving the polymer a greater ability to absorb acetate dyes and acid dyes, seriously reduces the heat stability of the polyethylene terephthalate so modified. Another effort in this direction involved chemical incorporation of long chain polyalkylene oxides having molecular weights of the order of 1000 to 6000. This modification of the polyethylene terephthalate unfortunately made it quite sensitive to air oxidation and to light. Another proposal involved the utilization of toxic carriers such as the chlorobenzenes, chlorophenols, and the like for the dyeing process. Still another involved the application of vat or acetate dyes under superatmospheric pressure at temperatures above 100° C. Another required the use of fiber swelling agents or dye carriers. Still another involved the use of pigments that are mixed directly with the polyethylene terephthalate melt before spinning.

It is apparent that these efforts have had no or very limited success. The methods involving chemical incorporation of modifying agents such as amino alcohols and polyalkylene oxides have involved substantial reduction in thermal stability, the use of toxic carriers is inherently undesirable and dangerous, and special dyeing techniques, such as those requiring dyestuffs that are stable at high temperatures, are too expensive to be commercially practicable.

These difficulties have now been overcome without significantly impairing the characteristics of polyethylene terephthalate. Thus, for example, polyethylene terephthalate fibers and films made in accordance with the method of this invention are readily dyeable by ordinary dyeing techniques while at the same time retaining excellent heat stability, dimensional stability and strength.

In accordance with the invention, polymeric ethylene terephthalate is modified by incorporating within the molecule a minor proportion of structural units haveing the formula

in which the R's are divalent alkylene radicals. This is preferably accomplished by carrying out the reaction of a lower alkyl terephthalate and ethylene glycol with a minor amount of dialkylene monosulfone diester.

In a preferred embodiment of the method of the invention, a dialkyl terephthalate is mixed with ethylene glycol and a minor proportion of monosulfone. The mixture is heated and reacted under conditions producing ester interchange as described in Patent 2,465,319 and then further heated for polycondensation or copolymerization of the monomers until a highly polymeric, linear ethylene terephthalate modified by occasionally recurring monosulfone units is formed.

The alkyl terephthalate monomer initially employed may be any of the lower alkyl esters of terephthalic acid which, upon undergoing ester interchange with ethylene glycol, forms an alcohol that has a boiling point below about 200° C. Dimethyl terephthalate is preferred because of its ready availability and the low boiling point of methyl acohol produced as a by-product during the ester interchange reaction.

The monosulfones that are suitable for use in modifying polyethylene terephthalate in accordance with the invention are those having the general formula

in which the R's are divalent alkylene radicals and the R"'s are alkyl radicals which also form alcohols having boiling points below about 200° C. when the sulfone undergoes ester interchange with ethylene glycol. The R's are preferably polymethylene radicals and the R''s are preferably lower alkyl radicals. Optimum results have been obtained with sulfones in which the R's are polymethylene radicals containing from three to five carbon atoms and the R''s are methyl. Thus, the sulfones that have been found to be particularly useful are dimethyl 6,6'-sulfonyldicaproate, dimethyl 5,5'-sulfonyldivalerate and dimethyl 4,4'-sulfonyldibutyrate.

It will readily be apparent from a consideration of the ultimate structure of the modified polyethylene terephthalates of the invention in which terephthalate and ethylene glycol residues are conjugated to form long chains, a terephthalate residue being occasionally replaced by a sulfone residue, that ethylene glycol must be used in a molar amount that is at least equal to the combined molar amounts of terephthalate and sulfone. For practical considerations, the minimum molar amount of ethylene glycol should be at least about twice the combined molar amount of terephthalate and sulfone. The preferred ratio is within the range of about three to ten times this amount. A greater excess of ethylene glycol does not by any means make the method inoperable but is not preferred because it serves no useful purpose and simply increases the amount of ethylene glycol that must be recovered in the polycondensation reaction.

The proportion of sulfone in the reaction mix is minor compared to the proportions of terephthalate and ethylene glycol. It should be at least sufficient significantly to improve the dyeability of the ultimate polymer yet not so great as to reduce its melting point too much. While effects may vary somewhat depending upon the particular sulfone that is used, it is generally desirable to limit the proportion of sulfone in the polymer to between about three and about seventeen mol percent based on the amount of total esters. It is to be understood of course that if less dyeability is required it is permissible to depart from this range by utilizing less than about three mole percent and that if melting points below about 230° C. are not considered a disadvantage, the sulfone content may be increased above the maximum specified.

The ester interchange can be effected at temperatures within the range of about 100 to 200° C., preferably about 160 to 185° C., and may be accelerated by the use of any one or combination of the well known ester interchange catalysts such as calcium, sodium, dibutyltin oxide, tributyltin hydroxide, dilauryltin oxide, lead borate, lead salicylate, lead benzoate, lead carbonate, lead acetate, dibutyltin dichloride, or the like. It is advantageous to perform the ester interchange under conditions that minimize oxidation and assist in removing alcohol that is first formed as a by-product and then removing excess glycol, e.g., by working at atmospheric or superatmospheric pressure while forcing or bubbling an inert gas such as nitrogen through the melt or by carrying out the ester interchange under subatmospheric pressure.

When the ester interchange is complete, as will be evident by a reduction in the rate of formation of alcohol, the reaction mix is subjected to polycondensation by further heating at a somewhat higher temperature within the range of about 200 to 300° C., preferably about 270 to 280° C. This polycondensation step can also be performed by the vacuum technique or by forcing an inert gas such as nitrogen through the melt and further by using one or more polycondensation catalysts. It is continued until filaments formed from the mass possess the property of cold-drawing.

A primary advantage of the invention is that shaped structures such as filaments, films, and the like, of polymeric ethylene terephthalate are dyeable to deep shades by conventional dyeing techniques and dyestuffs. Another important advantage is that dye dispersing agents and swelling agents are unnecessary for dyeing fabrics made from polyethylene terephthalate modified in accordance with the invention. Still another advantage is that the ready dyeability of the modified polyethylene terephthalate is obtainable without significant sacrifice of such other important characteristics as heat stability, strength and cold-drawing ability.

These and other advantages, as well as the utility of the method and products of the invention, will become further apparent from the following detailed examples included to illustrate the best modes now contemplated of carrying out the invention. In these examples, the parts are by weight (p.b.w.); dyeability is measured in percentage of total dye absorbed after two hours' dyeing and identified by the symbol $E_{AB}$; and reduced viscosity, used as a measure of the degree of polymerization, is defined as $$I_R = \frac{\left(\frac{\Delta N}{N_0}\right)}{C}$$

in which $\Delta N$ is the difference between flow time of solution and flow time of solvent, $N_0$ stands for flow time of solvent and $C$ is the concentration of the polymer in grams per 100 cc. of solution. Reduced viscosity values were obtained at 47° C., the solvent was a 3:2 mixture of phenol and tetrachloroethane, and the concentration of the polymer in the solution was 0.2 gram/100 cc.

*Example 1*

38.4 p.b.w. dimethyl terephthalate, 4.76 p.b.w. (7 mol percent total esters) dimethyl 6,6'-sulfonyldicaproate, 60 p.b.w. ethylene glycol and 0.034 p.b.w. calcium as catalyst in the form of a glycol derivative, were charged into a condensation vessel equipped at the bottom for introduction of finely dispersed nitrogen. Initial ester exchange was carried out over a period of 2.25 hours at 165 to 175° C. with continuous removal of methanol by a stream of introduced nitrogen. After the methanol distillation was complete, the temperature was raised to 250 to 260° C. in order to distill over the excess ethylene glycol, a small pressure of nitrogen again being used. The nitrogen stream was then increased to 3.5 liters per minute while the reactants were heated to 280° C. for 5½ hours.

A polymer having excellent fiber-forming and cold-drawing properties was obtained. It had a reduced viscosity of 0.58 and a melting point of 242 to 244° C.

*Example 2*

90 p.b.w. dimethyl terephthalate, 10 p.b.w. (6.3 mol percent total esters) dimethyl 6,6'-sulfonyldicaproate and 90 p.b.w. ethylene glycol were charged to a condensation vessel with 0.7 p.b.w. calcium and 0.3 p.b.w. sodium, both catalysts being dissolved in ethylene glycol. After an ester exchange reaction of two hours under the conditions described in Example 1, the temperature was increased to 280° C. This temperature was maintained for seven hours while forcing a vigorous nitrogen stream through the melt.

The resulting resin had a reduced viscosity of 0.76, a melting point of 251 to 253° C., was white in color and could easily be extruded into fibers having excellent cold-drawing properties.

*Example 3*

88 p.b.w. dimethyl terephthalate, 12 p.b.w. (7.6 mol percent total esters) dimethyl 6,6'-sulfonyldicaproate and 90 p.b.w. ethylene glycol were charged to a condensation vessel with .07 p.b.w. calcium and .03 p.b.w. sodium, both dissolved in ethylene glycol. After an initial ester exchange reaction at 175 to 185° C., as described in Example 1, the mixture was heated at 280° C. for seven hours while passing a vigorous stream of nitrogen through the melt to accomplish the polycondensation reaction.

A white, fiber-forming resin was obtained which had a melting point at 245 to 247° C. and a reduced viscosity of 0.68. Fibers formed therefrom could be stretched several hundred percent.

*Example 4*

85 p.b.w. dimethyl terephthalate, 15 p.b.w. (10.4 mol percent total esters) dimethyl 5,5'-sulfonyldivalerate and 90 p.b.w. ethylene glycol were charged to a condensation vessel with .1 p.b.w. calcium dissolved in ethylene glycol and .02 p.b.w. dibutyltin oxide. After an initial ester exchange reaction at 175° C. as described in Example 1, the mixture was heated to 280° C. for five hours to perform the polycondensation and a stream of nitrogen was passed through the melt to remove the glycol formed during the polycondensation.

A light ivory, fiber-forming resin was obtained which had a melting point at 238 to 240° C. and a reduced viscosity of 0.75.

Example 5

80 p.b.w. dimethyl terephthalate, 20 p.b.w. (14.15 mol percent total esters) dimethyl 5,5'-sulfonyldivalerate and 90 p.b.w. ethylene glycol were charged to a condensation vessel with .1 p.b.w. calcium dissolved in ethylene glycol and .02 p.b.w. dibutyltin oxide. The initial ester exchange was carried out at 175° C. and the polycondensation was performed while keeping the reactants at 280° C. for six hours. Both steps were conducted under nitrogen atmosphere as in Example 1.

A resin was obtained which had excellent fiber-forming properties, a melting point of 231 to 234° C. and a reduced viscosity of 0.81.

Example 6

90 p.b.w. dimethyl terephthalate, 10 p.b.w. (7.5 mol percent total esters) dimethyl 4,4'-sulfonyldibutyrate and 90 p.b.w. ethylene glycol were charged to a condensation vessel with 0.1 p.b.w. calcium dissolved in ethylene glycol. After two hours' initial ester exchange at 180° C., the polycondensation reaction was carried out as in Example 1 for 8.5 hours at 280° C.

A white resin having good cold-drawing properties was obtained. It melted at 241 to 244° C. and had a reduced viscosity of 0.58.

The resins described in Examples 2 to 5 were melt-spun, hot-stretched and knitted into tubing. These samples and a comparative simple of unmodified polyethylene terephthalate were then dyed under identical conditions with a dispersed acetate dye "Eastone Fast Red GLF" for two hours at 100° C., using a routine dyeing technique. The following results were obtained:

|  | Examples | | | | Control |
|---|---|---|---|---|---|
|  | 2 | 3 | 4 | 5 |  |
| Stretch: | | | | | |
| Percent | 350 | 350 | 350 | 450 | 450 |
| Temp., ° C | 95 | 115 | 115 | 90 | 120 |
| E_AB | 73.5 | 81.7 | 84.2 | 78 | 34.2 |

Example 7

200 p.b.w. dimethyl terephthalate, 14 p.b.w. (4.05 mol percent) dimethyl 6,6'-sulfonyldicaproate and 200 p.b.w. ethylene glycol were charged to a condensation vessel with 0.18 p.b.w. sodium and 0.19 p.b.w. calcium. After the initial ester interchange was performed as described in Example 1 at 185° C. over a period of two hours, the polycondensation was carried out at 275° C. for ten hours while a vigorous nitrogen stream was passed through the melt.

The resin obtained had a reduced viscosity of 0.56 and a melting point at 249 to 252° C.

Example 8

108 p.b.w. dimethyl terephthalate, 20 p.b.w. (10.04 mol percent) dimethyl 6,6'-sulfonyldicaproate and 110 p.b.w. ethylene glycol were charged to a condensation vessel with 0.13 p.b.w. calcium, 0.04 p.b.w. sodium and 0.01 p.b.w. tributyltin hydroxide. After an initial ester exchange reaction at 180° C., the polycondensation reaction was carried out at 270° C. for 7.5 hours while a vigorous nitrogen stream was passed through the melt.

A white resin was obtained which had excellent fiber-forming properties. It melted at 238 to 239° C. and had a reduced viscosity of 0.93.

Example 9

123 p.b.w. dimethyl terephthalate, 18 p.b.w. (8.1 mol percent) dimethyl 6,6'-sulfonyldicaproate and 120 p.b.w. ethylene glycol were heated with 0.12 p.b.w. calcium and 0.03 p.b.w. dilauryltin oxide in a condensation vessel at 185° C. to bring about the initial ester exchange according to the procedure described in Example 1. The removal of methanol was assisted by a stream of nitrogen which was passed through the melt. Polycondensation was performed by increasing the temperature to 280° C. and holding it there for 7.5 hours.

The resulting resin was white and showed superb fiber-forming and cold-drawing properties. It had a reduced viscosity of 0.81 and a melting point at 241 to 243° C.

Example 10

50 p.b.w. dimethyl terephthalate, 3.5 p.b.w. (4.06 mol percent) dimethyl 6,6'-sulfonyldicaproate and 50 p.b.w. ethylene glycol were charged to a condensation vessel with 0.02 p.b.w. lead borate and heated to 185° C. to bring about an initial ester exchange. The removal of methanol was assisted by a stream of nitrogen which was passed through the melt. Polycondensation was carried out by increasing the temperature to 275° C. and maintaining it for 6.5 hours.

The resulting resin was white and easily spun into fibers of excellent strength and pliability. It had a reduced viscosity of 0.64 and a melting point at 250 to 253° C.

Example 11

The procedure of Example 10 was repeated, 0.035 p.b.w. lead salicylate however being used as catalyst and the polycondensation being carried out for six hours.

The resulting resin had a reduced viscosity of 0.70, melted at 254 to 256° C. and was white in color.

Example 12

The procedure of Example 10 was repeated, 0.035 p.b.w. lead benzoate however being used as catalyst.

The resulting resin had a reduced viscosity of 0.59, a melting point at 255 to 256° C., and exhibited excellent fiber-forming and cold-drawing properties.

Example 13

A series of multi-filament yarns were prepared from polyethylene terephthalate (PTP) containing 3, 4 and 5 mol percent of dimethyl 6,6'-sulfonyldicaproate and compared with a commercial polyethylene terephthalate multi-filament yarn as well as with a laboratory prepared unmodified polyethylene terephthalate. All samples were spun at a temperature of about 280° C. using melt-draw ratios ranging from 40:1 to 60:1 and a take-up rate of about 170 feet per minute. The spun yarns were stretched 400 to 450% at about 70 to 80° C. over a "snubbing pin" on a stretching machine.

|  | Unmodified PTP | | PTP Modified with Sulfonyl dicaproate, Mol Percent | | | | |
|---|---|---|---|---|---|---|---|
|  | Commercial | Laboratory | 3% | 4% | 4% | 5% | 5% |
| Reduced Viscosity |  | 0.68 | 0.74 | 0.80 | 0.72 | 0.70 | 0.70 |
| Melting Point, ° C |  | 258 | 255 | 249 | 252 | 248 | 248 |
| Percent Cold-Draw |  | 450 | 400 | 410 | 400 | 440 | 400 |
| Draw-Pin, Temperature, ° C |  | 80 | 80 | 70 | 70 | 85 | 80 |
| Annealing Temperature, ° C |  |  |  |  | 200 |  | 200 |
| Annealing Time, Sec |  |  |  |  | 0.5 |  | 0.5 |
| Denier/Filament | 74/34 | 125/30 | 181/30 | 205/30 | 105/30 | 164/30 | 164/30 |
| Elongation, Percent | 14.0 | 11.0 | 19.3 | 19 | 15.5 | 19.0 | 19.0 |
| Acetate Dye Affinity, E_AB Percent | 30.4 | 30.6 | 47.7 | 46.1 | 45.7 | 55.4 | 67.1 |

These results show that the dye absorption increases remarkably with an increase in the sulfone content, being nearly doubled.

*Example 14*

50 p.b.w. dimethyl terephthalate, 4 p.b.w. (5.01 mol percent) dimethyl 5,5'-sulfonyldivalerate and 50 p.b.w. ethylene glycol were charged to a condensation vessel with 0.03 p.b.w. sodium and 0.04 p.b.w. dilauryltin oxide. After an initial ester exchange reaction at 185° C., the mixture was heated to 275° C. for six hours to perform the polycondensation reaction according to the procedure described in Example 1.

A fiber-forming resin, melting at 241 to 243° C. was obtained. It had a reduced viscosity of 0.65.

*Example 15*

42 p.b.w. dimethyl terephthalate, 3.3 p.b.w. (4.92 mol percent) dimethyl 5,5'-sulfonyldivalerate and 50 p.b.w. ethylene glycol were charged with 0.02 p.b.w. lead carbonate to a vessel suitable for operation at pressures slightly above atmospheric and equipped with an agitator and a diffuser at the bottom for introduction of nitrogen. An ester exchange reaction was carried out at 175° C. with a continuous removal of methanol by passing a slow stream of nitrogen through the melt. After ester exchange was complete, the melt was heated for six hours at 275° C. while passing a vigorous nitrogen stream through the melt.

The resulting resin was white in color and had a reduced viscosity of 0.64. It was readily extrudable to fibers that had good dye receptivity and strength.

*Example 16*

48 p.b.w. dimethyl terephthalate, 2 p.b.w. (2.95 mol percent) dimethyl 4,4'-sulfonyldibutyrate and 50 p.b.w. ethylene glycol were charged to a condensation vessel with 0.03 p.b.w. sodium and 0.03 p.b.w. dibutyltin dichloride. An initial ester exchange reaction was carried out at 185° C. for three hours with continuous removal of methanol in a slow nitrogen stream. The temperature was then raised to 275° C. and maintained there for five hours while passing a vigorous nitrogen stream through the melt.

The resulting resin had a reduced viscosity of 0.61 and melted at 253 to 255° C. It was white and easily extrudable into fibers possessing excellent cold-drawing properties.

*Example 17*

The general procedure of Example 15 was repeated except that 48 p.b.w. dimethyl terephthalate, 2 p.b.w. dimethyl 4,4'-sulfonyldibutyrate and 50 p.b.w. ethylene glycol were charged to the condensation vessel with 0.025 p.b.w. lead acetate. The ester interchange was performed at 185° C. over a period of three hours and the polycondensation was conducted for 7.7 hours at 275° C.

The resulting polymer was white in color, easily extrudable into fibers and had a reduced viscosity of 0.60.

*Example 18*

Three modified polymeric ethylene terephthalates were prepared by subjecting dimethyl terephthalate, ethylene glycol and a modifying agent to ester interchange and polycondensation in the manner described in the examples. In each instance the molar ratio of terephthalate to ethylene glycol was 1:3. In one run the modifying agent was dimethyl sebacate in an amount equivalent to 5 mol percent of total esters and in two other runs the modifying agent was dimethyl 6,6'-sulfonyldicaproate in amounts of 2 and 5 mol percent.

The melting points and percent dye absorption of the three modified polyethylene terephthalates thus obtained are compared in the table below with the corresponding values for an unmodified polyethylene terephthalate:

| | Melting Point, ° C. | Dyeability, $E_{AB}$, Percent |
|---|---|---|
| Polyethylene Terephthalate | 261 | 49.4 |
| Sebacic Acid (5 mol percent) Copolyester | 250-2 | 55.0 |
| Sulfone (2 mol percent) Copolyester | 258 | 55.7 |
| Sulfone (5 mol percent) Copolyester | 246-8 | 88.7 |

The data in this table shows that the unmodified and the sebacic acid modified polyethylene terephthalates have approximately the same poor dye absorption characteristics, whereas the sulfone-modified polyethylene terephthalate had markedly better dye absorption, particularly at a 5 mol percent concentration. Inasmuch as the various fiber samples had approximately the same high crystallinity, it is believed that the phenomenon can be explained only on the basis of a higher dye attraction due to the polar sulfone groups. It is also important to note that the melting point of the sulfone-modified polyester is not appreciably lower.

It is to be understood that numerous modifications will readily become apparent to those skilled in the art upon reading this description. All such modifications are intended to be included within the scope of the invention as defined in the appended claims.

I claim:

1. A fiber-forming polymeric linear ethylene terephthalate consisting of recurring structural units of the formulae

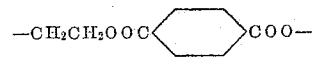

and

—CH₂CH₂OOCRSO₂RCOO— wherein the R's are divalent polymethylene groups containing from three to five carbon atoms, the proportion of sulfone in the polymer being between about 3 and about 17 mol percent based on the total amount of esters.

2. A fiber-forming polymeric linear ethylene terephthalate consisting of recurring structural units of the formulae

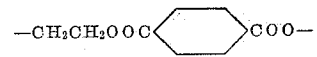

and

—CH₂CH₂OOCRSO₂RCOO— wherein the R's are divalent trimethylene groups, the proportion of sulfone in the polymer being between about 3 and about 17 mol percent based on the total amount of esters.

3. A fiber-forming polymeric linear ethylene terephthalate consisting of recurring structural units of the

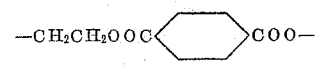

—CH₂CH₂OOCRSO₂RCOO— wherein the R's are divalent tetramethylene groups, the proportion of sulfone in the polymer being between about 3 and about 17 mol percent based on the total amount of esters.

4. A fiber-forming polymeric linear ethylene terephthalate consisting of recurring structural units of the formulae

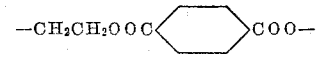

and

—CH₂CH₂OOCRSO₂RCOO— wherein the R's are divalent pentamethylene groups, the proportion of sulfone in the polymer being between about 3 and about 17 mol percent based on the total amount of esters.

5. A polyethylene terephthalate fiber having, as part of the chain and as the sole chain modifying agent therefor, a minor proportion of dialkylene monosulfone units having the formula

—CH$_2$CH$_2$OOCRSO$_2$RCOO— wherein the R's are divalent polymethylene groups containing from three to five carbon atoms, the proportion of sulfone in the polymer being between about 3 and about 17 mol percent based on the total amount of esters.

6. A polyethylene terephthalate fiber having, as part of the chain and as the sole chain modifying agent therefor, a minor proportion of dialkylene monosulfone units having the formula

—CH$_2$CH$_2$OOCRSO$_2$RCOO— wherein the R's are divalent trimethylene groups, the proportion of sulfone in the polymer being between about 3 and about 17 mol percent based on the total amount of esters.

7. A polyethylene terephthalate fiber having, as part of the chain and as the sole chain modifying agent therefor, a minor proportion of dialkylene monosulfone units having the formula

—CH$_2$CH$_2$OOCRSO$_2$RCOO— wherein the R's are divalent tetramethylene groups, the proportion of sulfone in the polymer being between about 3 and about 17 mol percent based on the total amount of esters.

8. A polyethylene terephthalate fiber having, as part of the chain and as the sole chain modifying agent therefor, a minor proportion of dialkylene monosulfone units having the formula

—CH$_2$CH$_2$OOCRSO$_2$RCOO— wherein the R's are divalent pentamethylene groups, the proportion of sulfone in the polymer being between about 3 and about 17 mol percent based on the total amount of esters.

9. A dye-receptive fiber of a polyester of reactants consisting essentially of dimethyl terephthalate, ethylene glycol and a sulfonyl diester having the formula SO$_2$[(CH$_2$)$_n$COOCH$_3$]$_2$ wherein the $n$'s are integers from 3 to 5, the proportion of sulfone in the polymer being between about 3 and about 17 mol percent based on the total amount of esters.

10. Method for preparing a dye-receptive polyester which comprises subjecting a mixture consisting essentially of dialkyl terephthalate in which the alkyl groups are radicals of alcohols having boiling points below about 200° C., ethylene glycol and between about 3 and about 17 mol percent, based on the total amount of esters, of a sulfonyl diester having the formula SO$_2$[(CH$_2$)$_n$COOCH$_3$]$_2$ wherein the $n$'s are integers from 3 to 5 to an initial ester exchange by heating the reactants to a temperature within the range of about 100 to 200° C. until elimination of alcohol therefrom is substantially complete and thereupon maintaining the reactants at a temperature of the order of about 200 to 300° C. to obtain a fiber-forming melt.

11. Method as defined in claim 10 wherein the initial ester exchange and subsequent polycondensation are carried out in the presence of a catalyst.

12. A process for preparing modified polyethylene terephthalate polymer containing dye-receptive sulfonyl groups which comprises heating, to a temperature within the range of about 100 to 200° C., a mixture consisting essentially of dialkyl terephthalate in which the alkyl groups are radicals of alcohols having boiling points below about 200° C., ethylene glycol and between about 3 and about 17 mol percent, based on the total amount of esters, of a dialkylene monosulfonyl diester having the formula

SO$_2$[RCOOR']$_2$ wherein the R's are divalent polymethylene groups containing from three to five carbon atoms and the R''s are lower alkyl radicals of alcohols having boiling points below about 200° C. until elimination of alcohol therefrom is substantially complete, and continuing the heating to obtain a fiber-forming melt.

13. A process for preparing modified polyethylene terephthalate polymer containing dye-receptive sulfonyl groups which comprises heating, to a temperature within the range of about 100 to 200° C., a mixture consisting essentially of dimethyl terephthalate, between about 3 and about 17 mol percent, based on the total amount of esters, of a dialkylene monosulfone diester having the formula

SO$_2$[RCOOR']$_2$ wherein the R's are divalent polymethylene groups containing from three to five carbon atoms and the R''s are lower alkyl radicals of alcohols having boiling points below about 200° C., and from one to ten mols ethylene glycol per combined mol of dimethyl terephthalate and sulfone until elimination of alcohol therefrom is substantially complete, and continuing the heating to obtain a fiber-forming melt.

14. A process for preparing modified polyethylene terephthalate polmer containing dye-receptive sulfonyl groups which comprises heating, to a temperature within the range of about 100 to 200° C., a mixture consisting essentially of dimethyl terephthalate, between about 3 and about 17 mol percent, based on the total amount of esters, of a dialkylene monosulfone diester having the formula SO$_2$[(CH$_2$)$_n$COOCH$_3$]$_2$ wherein the $n$'s are integers from 3 to 5, and from one to ten mols ethylene glycol per combined mol of dimethyl terephthalate and sulfone until elimination of alcohol therefrom is substantially complete, and continuing the heating to obtain a fiber-forming melt.

15. The method as defined in claim 14 wherein $n$ is 3.
16. The method as defined in claim 14 wherein $n$ is 4.
17. The method as defined in claim 14 wherein $n$ is 5.

References Cited in the file of this patent

UNITED STATES PATENTS

| 2,427,640 | Whitehill et al. | Sept. 16, 1947 |
| 2,720,502 | Caldwell | Oct. 11, 1955 |
| 2,744,094 | Caldwell | May 1, 1956 |

FOREIGN PATENTS

| 402,799 | Italy | Mar. 24, 1943 |